Dec. 20, 1927. 1,653,533
G. B. AMBLER
FOLDING GO-CART
Filed Oct. 31, 1925    2 Sheets-Sheet 1
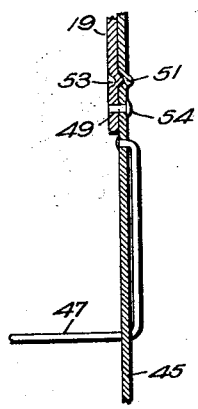
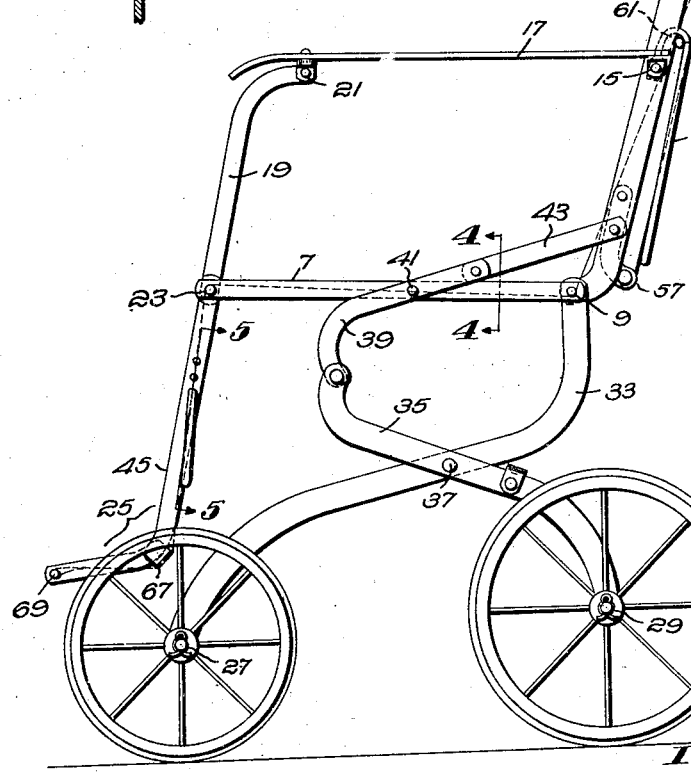
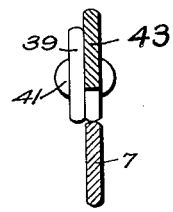
Inventor:
George B. Ambler, Dec. 20, 1927.  
G. B. AMBLER  
1,653,533  
FOLDING GO-CART  
Filed Oct. 31, 1925  
2 Sheets-Sheet 2
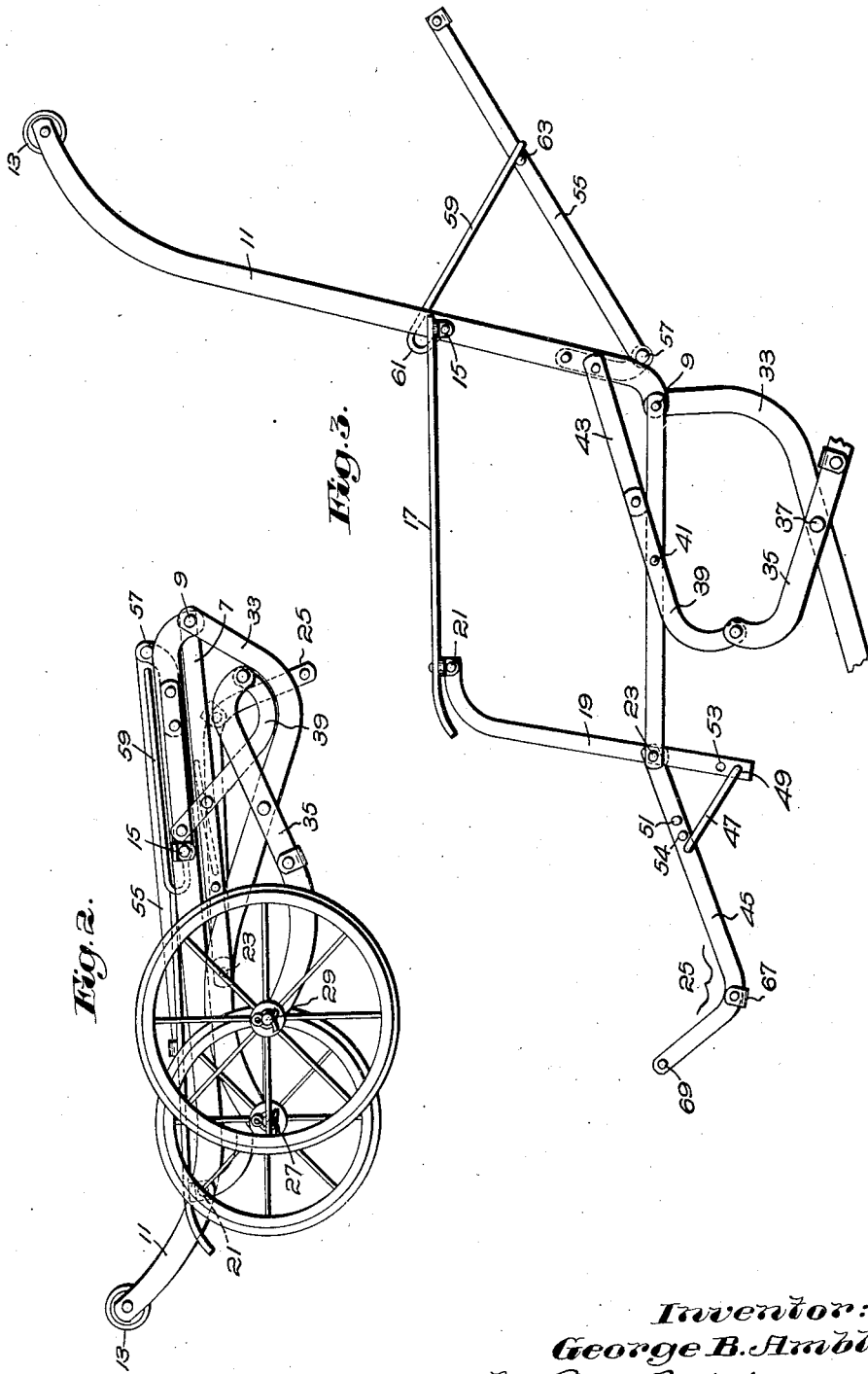
Inventor:  
George B. Ambler,  
by Emery, Booth, Janney & Varney  
Attys.

Patented Dec. 20, 1927.

1,653,533

UNITED STATES PATENT OFFICE.

GEORGE B. AMBLER, OF LEOMINSTER, MASSACHUSETTS, ASSIGNOR TO F. A. WHITNEY CARRIAGE COMPANY, OF LEOMINSTER, MASSACHUSETTS, A CORPORATION OF MASSACHUSETTS.

FOLDING GOCART.

Application filed October 31, 1925. Serial No. 65,995.

This invention relates to light vehicles such as are used for the transportation of young children and the purpose is to provide such a vehicle of the folding or collapsible type which may be folded and unfolded quickly, which will be rigid and strong when erected and which will fold compactly for storage or transportation.

My invention will be well understood by reference to the following description of one embodiment thereof shown by way of example in the accompanying drawings, wherein:

Fig. 1 is a side elevation of a go-cart in erected position;

Fig. 2 is a similar view of the same folded or collapsed;

Fig. 3 is a broken away view similar to Fig. 1 showing the parts in a different position of adjustment; and Figs. 4 and 5 are sections on enlarged scales on the lines 4—4 and 5—5 of Fig. 1, respectively.

In the example of my invention shown for purposes of illustration the vehicle as a whole is constructed of two folding side frames of similar contruction spaced by the axle and suitable distance pieces or crossbars. Conveniently these side frames are formed of flat metal strips.

Referring to Fig. 1 of the drawings and describing first the body of the vehicle, a pair of side members 7 may define the seat. Pivoted to these at the pivot 9 are side members 11 which define the back of the seat and which may extend upwardly for a considerable distance and be joined by a pusher bar 13 to provide a handle by which the vehicle as a whole is trundled when in use. Pivoted at intermediate points 15 along the members 11 are arms 17 supported by elements 19 pivoted at 21 to the forward end of the arms and at 23 to the front of the seat members 7. The members 19 may be extended below the seat to support the foot rest 25. This foot rest may conveniently, although not necessarily, be made adjustable in the manner hereinafter more fully described.

The parts 7, 11, 17 and 19 form a quadrilateral structure pivoted at the corners 9, 15, 21 and 23 which may be collapsed, the upstanding members 11 and 19 folding over to the left relatively to the seat 7, thus folding the back down above the seat and swinging the foot rest up beneath the seat as the upstanding portions of the members 19 swing forwardly. Suitable means may be provided for holding the parts in erected position. In the present embodiment of the invention this is effected by the same mechanism as is utilized for holding erected the collapsible running gear and the description thereof will herein be postponed to the description of the form of running gear herein shown.

The seat is supported from the forward axle 27 and the rear axle 29 by crossed legs 33 and 35 pivoted together in the manner of a saw buck at points intermediate their length at 37. One set of legs, herein the legs 33 extending from the forward axle 27, may be pivoted directly to the seat conveniently at the pivot 9. The other set of legs 35 may be pivoted indirectly by means of radius links 39 pivoted at 41 at locations between the ends of the seat frame pieces 7 and rearward of the upper ends of legs 35 when the running gear is in the erected position of Fig. 1. This arrangement permits the legs 33 to swing clockwise about the pivot 9 up underneath the seat and at the same time the legs 35 to swing clockwise about the pivot 37 to lie adjacent the legs 33 with the ends carrying the wheels pointing in the same direction, as illustrated in Fig. 2. Any suitable means may be provided for checking the swinging of links 39 thereby to hold the parts in the erected position of Fig. 1 but herein I have shown each link extended past its pivot 41 to provide an arm of a toggle, the other arm of which is formed by link 43 pivoted to a point of the back link 11 remote from the pivot 9. The toggle may be straightened as shown in Fig. 1, and I have herein (see Fig. 4) shown the end of link 43 as engaging the upper part of the seat frame member 7 to provide a stop to prevent reverse breaking of the toggle and to limit the clockwise swinging of the link 39. It will be seen from Fig. 1 that as the weight of the vehicle tends to spread apart the front and rear wheels and to depress the pivot point 37 relatively to the rear axle 29 the left hand ends of the legs 35 are supported against downward movement.

The toggle formed by the links 39 and 43 also serves as a brace for the back pieces 11, holding them fixed relatively to the seat 7, and consequently the whole quadrilateral structure of the body of the carriage is held against collapsing.

By virtue of the interconnection of the parts as described in the embodiment of the invention shown the folding of the body and of the running gear takes place concomitantly. The parts being erected in the position shown in Fig. 1, in order to collapse the vehicle the toggle formed by the links 39 and 43 may be broken by hand and the back 11 may then fold down over the seat. As this is done the foot rest in carried up under the seat by the swinging of the arm supports 19, the legs 35 are swung clockwise about the pivots 37 to lie under the seat with the wheels pointing forward and as they complete this movement the upper portions of the legs 35 and the lower portions of the links 39 folding together draw up the legs 33 closely adjacent the bottom of the seat, the wheels of the forward axle likewise pointing forwardly and the whole vehicle assuming the position of Fig. 2. To erect the vehicle a foot may be braced against one of the axles and the cross-bar or pusher handle 13 lifted to unfold the back 11 relatively to the seat 7. As this rises the foot rest is swung forwardly and the back serves as a lever handle connected through the links 43 to the running gear to expand the same to the position shown in Fig. 1.

In the form of my invention herein shown in the drawings I have illustrated a go-cart having a reclining back and an adjustable foot rest. If utilized these may take the form shown in Fig. 3. Referring first to the foot rest, this is herein shown as comprising two side members 45 pivoted adjacent the front of the seat conveniently at the pivot 23 and adapted to lie when in the position of Fig. 1 adjacent the downward extensions of the members 19, as shown in Fig. 1. These members 45 may be swung upwardly to the position shown in Fig. 3 and suitable means may be provided for retaining them in this position, herein shown as a bail 47 (see Fig. 5) having its ends pivoted in the members 45 and adapted when the parts are in the position shown in Fig. 1 to hang idly against the same as there illustrated. When it is desired to bring the foot rest to the raised position of Fig. 3 it may be lifted manually and the cross-bar of the bail disposed in suitable notches 49 in the downwardly extending portions of the members 19, the bail thus forming a brace supporting the foot rest. To prevent loose movement of the foot rest in the lowered position of Fig. 1 and to insure its movement up under the seat of the vehicle when the vehicle is being folded suitable means may be provided for engaging it with the downward extensions of the members 19. This conveniently takes the form of a spring catch which may operate through the lateral flexibility of the metal strip of which the parts are constructed. Referring to Fig. 5, I have herein shown a suitable recess 51 formed in the member 45, conveniently by striking up a portion of the same, into which is adapted to snap a cooperating boss 53 raised on the adjacent element 19, likewise conveniently made by striking up a portion of the same. This will lock the sides 45 of the foot rest to the extensions of the parts 19 and in alignment therewith with sufficient security to insure the folding of the former with the latter from the position of Fig. 1 to the position of Fig. 2 but will permit the foot rest to be swung upwardly by hand when it is desired to adjust it to the position of Fig. 3. Pins 54 on members 45 (see Fig. 5) may enter the notches 49 when the parts are in the position of Fig. 1 to prevent the members moving further inwardly.

I have herein shown the vehicle as provided with a suitable reclining back of a type in itself not new in the present application. This may embody a suitable back frame 55 pivoted to ears 57 on the lower ends of the back members 11. The back 55 is suspended in the reclining position of Fig. 3 by the cross-bar of a bail 59 having re-curved or hook-like ends 61 terminally pivoted to the back members 11. Projecting pins 63 on the back 55 prevent the bail from dropping down towards the bottom of the back. When it is desired to raise the back from the position of Fig. 1 it is simply swung upwardly and the bail drops downwardly to the position shown in Fig. 1. The pins 63 are then disposed in the throats of the hooks 61 and the rearward pressure thereof tends to rock the hooks clockwise and presses the cross-bar of the bail inwardly, to the left in Fig. 1 against the stop provided by the back 55. The pins thus are retained in the position of Fig. 1 holding the back 55 in the upright position. The back may be lowered, however, by grasping the cross-bar of the bail where it lies adjacent the lower end of the back piece 55 in Fig. 1 and lifting it manually toward the position of Fig. 3, freeing the pins 63 from the throats of the hooks and allowing the back to fall.

The supporting surfaces of the body extending between the side frames may be constructed in any suitable manner but I may utilize a single piece 65 of flexible material such as canvas, indicated by the dotted line of Fig. 1, which is trained from the top of the back, herein the top of the back piece 55, to the bottom of the back and across the seat, herein under and over the cross-bars which provide the pivots 9 and 23 respectively, down between the sides 45 of the foot rest around the distance piece 67 at the angle of the latter and is secured terminally to the cross-bar 69 at the end of the foot rest side pieces. The portion of the canvas which forms the seat bottom between the pieces 7 may, if desired, be stiffened in any suitable manner. This arrangement is light and convenient and offers no impediment to the folding of the vehicle in the manner described.

I have described in detail the particular embodiment of my invention herein shown, involving an organized structure having many cooperating parts and organized and related in one suitable manner. Obviously the construction could take other forms and the invention might be embodied in vehicles not so highly organized and omitting some of the parts or capabilities of the embodiment shown or substituting others for them. The detailed character of the description, therefore, has had for its purpose to make clear the construction and operation of the particular embodiment of the invention shown and should not be understood as in any way defining the scope thereof. What I claim as new and desire to secure by Letters Patent I shall express in the following claims.

I claim—

1. A folding structure of the class described comprising a seat, a back, arms and arm supports pivoted together as a quadrilateral assembly, the arm supports being extended beneath the seat and carrying a foot rest which folds up under the seat when the parts are collapsed, crossed legs, one pair directly pivoted to the seat, and foldable braces between the other legs and the back adapted mutually to support the back in raised position and to maintain the legs extended.

2. A folding structure of the class described comprising a seat, a back, arms and arm supports pivoted together as a quadrilateral assembly, the arm supports being extended beneath the seat, a foot rest pivoted at the front of the seat to be adjusted to different angular positions and having means to engage it with said supports to fold therewith under the bottom of the seat when the parts are collapsed and means for locking the parts in extended position.

3. A folding structure of the class described comprising a seat, a back pivoted thereto, a toggle brace interposed between back and seat for maintaining the back erect, and a collapsible support for the seat, an arm of the toggle being extended to provide a brace for maintaining the support in extended position.

4. A folding structure of the class described comprising a seat, a back pivoted thereto, a toggle brace interposed between back and seat for maintaining the back erect, sides pivoted to the back and substantially paralleling the seat, links pivoted to said sides and at the front of the seat, said links extending beneath the latter and carrying a foot rest, and a collapsible support for the seat, an arm of the toggle being extended to provide a brace for maintaining the support in extended position.

5. A folding structure of the class described comprising a seat, a back pivoted thereto, crossed legs, one pair of legs directly pivoted to the seat, links pivotally connecting the other legs to the seat and other links pivoted to the first links and the back and forming therewith toggles to maintain the back erect and the legs extended.

6. A folding structure of the class described comprising a seat, a back pivoted thereto, a toggle brace for maintaining the back erect, and a collapsible support for the seat, an arm of the toggle being extended to provide a brace for maintaining the support in extended position, one of the arms of the toggle then engaging the seat which forms a stop therefor.

7. A folding structure of the class described comprising a seat, a back pivoted thereto, crossed legs, one pair of legs directly pivoted to the seat, links pivotally connecting the other legs to the seat and other links pivoted to the first links and the back and forming therewith toggles to maintain the back erect and the legs extended, said other links engaging the seat to prevent reverse breaking of the toggles.

8. A folding structure of the class described comprising a seat, pivoted links at the sides forming with the seat collapsible quadrilaterals and providing a back, the forward links of the sides extending past the seat, a foot rest having side members pivoted at the front of the seat and lying adjacent the extended portions of the links, means for supporting the foot rest in a raised position and a snap catch between the side members and the links to cause them to move together.

9. A folding structure of the class described comprising a seat, pivoted links at the sides forming with the seat collapsible quadrilaterals and providing a back, the forward links of the sides extending past the seat, a foot rest having side members pivoted at the front of the seat and lying adjacent the extended portions of the links, a bail pivoted to the side members, there being notches in the links to receive the bail to support the foot rest in a raised position and a snap catch between a side member and an adjacent link to cause them to move together.

10. In a structure of the class described a seat, side members depending therefrom, an angularly adjustable foot rest having sides pivoted at the front of the seat and lying adjacent said members, means for supporting the foot rest in raised position and a snap catch between a side member and a side of the foot rest to lock them together.

11. In a structure of the class described a seat, side members depending therefrom, an angularly adjustable foot rest having sides pivoted at the front of the seat and lying adjacent said members, means for supporting the foot rest in raised position and a snap catch between a side member and a side of the foot rest to lock them together comprising a recess in one and a cooperating boss raised from the other and adapted to be engaged and disengaged through lateral yielding of the parts.

In testimony whereof, I have signed my name to this specification.

GEORGE B. AMBLER.